US012114208B2

United States Patent
Lindoff et al.

(10) Patent No.: US 12,114,208 B2
(45) Date of Patent: Oct. 8, 2024

(54) CLIENT DEVICE FOR INDICATION OF NON-FULFILLMENT OF QoS REQUIREMENT

(71) Applicant: Huawei Technologies Co., Ltd., Shenzhen (CN)

(72) Inventors: Bengt Lindoff, Kista (SE); Gustaf Claeson, Lund (SE); Wenquan Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 17/534,211

(22) Filed: Nov. 23, 2021

(65) Prior Publication Data
US 2022/0095170 A1    Mar. 24, 2022

Related U.S. Application Data

(63) Continuation of application No. PCT/EP2019/063389, filed on May 23, 2019.

(51) Int. Cl.
*H04W 28/24*    (2009.01)

(52) U.S. Cl.
CPC ................................. *H04W 28/24* (2013.01)

(58) Field of Classification Search
CPC ...................................................... H04W 28/24
(Continued)

(56) References Cited

U.S. PATENT DOCUMENTS

| 11,153,833 B2 | 10/2021 | Balachandran et al. |
| 2017/0230956 A1* | 8/2017 | Kim ..................... H04L 5/0032 |

(Continued)

FOREIGN PATENT DOCUMENTS

| CN | 102396259 A | 3/2012 | |
| JP | 6808035 B2 | 1/2021 | |
| WO | WO-2017135998 A1 * | 8/2017 | .......... H04W 74/085 |
| WO | WO-2019032503 A1 * | 2/2019 | ............ H04W 24/04 |

OTHER PUBLICATIONS

Huawei et al., "Add indication of Notification Control to QoS rules sent to UE," 3GPP TSG-SA WG2 Meeting #127bis, Newport Beach, USA, S2-186157, XP051459137, total 2 pages, 3rd Generation Partnership Project, Valbonne, France (May 28-Jun. 1, 2018).

(Continued)

*Primary Examiner* — Anthony Mejia
(74) *Attorney, Agent, or Firm* — Leydig, Voit & Mayer, Ltd.

(57) ABSTRACT

A client device and a corresponding method for detecting and indicating that a Quality-of-Service (QoS) estimate for a radio link serving an application does not fulfill a QoS requirement associated with the application is provided. The client device monitors QoS estimates for a radio link serving an application in the physical layer. The monitoring is based on a QoS monitoring configuration associated with the application. Upon detecting that a QoS estimate does not fulfill a QoS requirement obtained from the QoS monitoring configuration, the client device provides a first indication to a second layer arranged above the physical layer. The first indication provides an early warning that the radio link does not fulfill the QoS requirement. According to the application, the client device is allowed to take precautionary actions to counteract possible negative consequences of the non-fulfillment of the QoS requirement.

20 Claims, 2 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2018/0176830 | A1* | 6/2018 | Yang | H04W 24/08 |
| 2019/0052377 | A1 | 2/2019 | Hwang et al. | |
| 2019/0053293 | A1* | 2/2019 | Akoum | H04W 72/23 |
| 2022/0022192 | A1* | 1/2022 | Sakhnini | H04L 5/0023 |
| 2022/0086741 | A1* | 3/2022 | Liao | H04W 4/44 |
| 2022/0132603 | A1* | 4/2022 | Adjakple | H04W 8/005 |

OTHER PUBLICATIONS

"3rd Generation Partnership Project; Technical Specification Group Radio Access Network; NR; Requirements for support of radio resource management (Release 15)," 3GPP TS 38.133 V15.5.0, total 893 pages, 3rd Generation Partnership Project, Valbonne, France (Mar. 2019).

Huawei et al., "KI#3: Evaluation of Solution 16," SA WG2 Meeting #129bis, West Palm Beach, FL, USA, S2-1812381 (was of S2-1810636), XP051563894, total 6 pages, 3rd Generation Partnership Project, Valbonne, France (Nov. 26-30, 2018).

"3rd Generation Partnership Project; Technical Specification Group Radio Access Network; NR;Physical channels and modulation(Release 15)," 3GPP TS 38.211 V15.5.0, total 96 pages, 3rd Generation Partnership Project, Valbonne, France (Mar. 2019).

"3rd Generation Partnership Project; Technical Specification Group Radio Access Network; NR; Physical layer procedures for control (Release 15)," 3GPP TS 38.213 V15.5.0, total 104 pages, 3rd Generation Partnership Project, Valbonne, France (Mar. 2019).

"3rd Generation Partnership Project; Technical Specification Group Radio Access Network; NR; Physical layer procedures for data (Release 15)," 3GPP TS 38.214 V15.5.0, total 103 pages, 3rd Generation Partnership Project, Valbonne, France (Mar. 2019).

"3rd Generation Partnership Project; Technical Specification Group Radio Access Network; NR;Radio Resource Control (RRC) protocol specification (Release 15)," 3GPP TS 38.331 V15.5.1, total 491 pages, 3rd Generation Partnership Project, Valbonne, France (Apr. 2019).

"3rd Generation Partnership Project;Technical Specification Group Radio Access Network; Study on Scenarios and Requirements for Next Generation Access Technologies; (Release 15)," 3GPP TR 38.913 V15.0.0, total 39 pages, 3rd Generation Partnership Project, Valbonne, France (Jun. 2018).

* cited by examiner

CLIENT DEVICE FOR INDICATION OF NON-FULFILLMENT OF QoS REQUIREMENT

CROSS-REFERENCE TO RELATED APPLICATIONS

This application is a continuation of International Application No. PCT/EP2019/063389, filed on May 23, 2019, the disclosure of which is hereby incorporated by reference in its entirety.

TECHNICAL FIELD

Embodiments of the disclosure relate to a client device for detection and indication of a non-fulfillment of a Quality-of-Service (QoS) requirement for a radio link. Furthermore, the disclosure also relates to corresponding methods and a computer program.

BACKGROUND

A critical requirement of 3GPP 5G new radio (NR) is the support for ultra-reliable low latency communication (URLLC) services, where latency expresses the time required for transmitting a message through the network. The requirement in Rel-15 for URLLC has been set to a latency of 1 ms, one way over the radio access network, combined with a packet error rate (PER) of 10e-5. For Rel-16 it is expected that the requirements will be set even tougher.

An application will request certain QoS of the 5G network and may have multiple data streams, each with an individual QoS setting. If the requested levels of QoS are accepted by the 5G network, the 5G network will try to fulfil its QoS obligations towards the application over time. In wireless networks, there are several factors affecting the QoS that can be achieved in reality such as e.g. unpredictable movement of the client device or movement from other objects causing blocking of radio signals. Hence, there will be situations where the negotiated QoS will not be met.

For future application types, targeted by NR, this fact may be critical. Example of areas for such URLLC traffic can be within the road traffic control and management, production industry or health care, with applications such as remote driving, platooning, factory automation or remote surgery. These are typical examples of applications that do not only require demanded QoS but also represent cases where an instantaneous failure or rapid degradation of the actually delivered QoS from the radio access network can have dire consequences. This fact has been lifted by organisations, such as 5GAA and 5G-ACIA, setting the input requirements for 5G focusing on vehicle and industrial use cases, respectively, where prediction of delivered QoS is seen as an important area.

Packet duplication, which is one way to increase the reliability, was introduced in Rel-15 to facilitate URLLC services. In Rel-15, packet duplication is configured with either carrier aggregation (CA) or dual connectivity (DC). In future releases, packet duplication with DC and CA will also be supported. For the duplication case the network ensures using different component carriers for the respective transmission of different radio link control entities with logical channel mapping restrictions.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a client device for a wireless communication system, the client device being configured to obtain a Quality-of-Service, QoS, monitoring configuration associated with an application in a first layer;

determine QoS estimates for a radio link, serving the application, in the first layer;

provide a first indication from the first layer to a second layer upon detecting that a QoS estimate does not fulfill a QoS requirement obtained from the QoS monitoring configuration, wherein the first layer is a physical layer arranged below the second layer.

An application herein can be understood to be any service that can be supported in the wireless communication network and which can use communication resources in the core network and the radio access network. Examples of applications are factory automation, augmented reality, virtual reality, and vehicle-to-anything. Unless otherwise stated the application herein corresponds to an application in the client device. The application in the client device can typically be arranged to communicate with a corresponding application in a data network or a core network. The application can have one or more QoS flows and the QoS monitoring configuration can be applicable to one or more of the QoS flows.

A QoS estimate can in this disclosure be understood to mean a value or metric corresponding to a QoS which is possible to achieve over the radio link, i.e. an estimation/prediction of the achievable QoS. The QoS estimate may e.g. be obtained based on a measured and/or calculated radio link quality in dependence on a rule or a formula.

An advantage of the client device according to the first aspect is that it can quickly detect potential radio link problems which may affect the radio link's ability to fulfil QoS requirements. Thereby, robustness of high reliability/low latency applications can be improved, e.g. by allowing the application to go into safe mode in a controlled way. The client device according to the first aspect further enables the detection and indication of non-fulfillment of QoS requirements to be triggered autonomously in the client device with only a semi-static configuration from the network. Hence, avoiding a real-time dependency towards the network at the moment of detection of QoS degradation. Furthermore, with the QoS monitoring configuration the detection and indication of non-fulfillment of QoS requirements can be tuned towards different services such that optimized per service reliability can be achieved In an implementation form of a client device according to the first aspect, the client device is further configured to provide a second indication from the first layer to the second layer upon detecting that a QoS estimate fulfills a QoS requirement.

An advantage with this implementation form is that it can inform the application quickly once the radio link quality has been restored, thereby improving QoS of the high reliability/low latency application.

In an implementation form of a client device according to the first aspect, the QoS monitoring configuration indicates at least one of a QoS monitoring rule, the radio link serving the application, a timer associated with the radio link, a QoS requirement, an offset factor, a weight factor.

An advantage with this implementation form is that the client device knows what and how to monitor, and thereby efficient and consistent monitoring of the radio link can be achieved.

In an implementation form of a client device according to the first aspect, the QoS requirement is dependent on one or more characteristics of QoS flows or IP packet flows associated with the application, wherein the one or more characteristics are at least one of a 5G QoS identifier, a QoS flow identifier, a resource type, a packet error rate, a packet delay budget, a survival time and a jitter.

The survival time can be a time period that an application consuming a communication service may continue without an anticipated message.

An advantage with this implementation form is that these parameters are associated with QoS of the application and hence deriving the QoS requirement based on these parameters gives optimized QoS performance.

In an implementation form of a client device according to the first aspect, the QoS requirement is a QoS threshold value obtained from the QoS monitoring configuration.

An advantage with this implementation form is that a low complexity implementation of monitoring whether QoS is sufficient can be achieved.

In an implementation form of a client device according to the first aspect, the QoS requirement is a QoS threshold value obtained from the QoS monitoring configuration in dependence on a predefined rule.

An advantage with this implementation form is that a low complexity implementation of monitoring whether QoS is sufficient can be achieved.

In an implementation form of a client device according to the first aspect, detecting that the QoS estimate does not fulfill the QoS requirement comprises determine that the QoS estimate for the radio link is below the QoS threshold value.

An advantage with this implementation form is that a low complexity implementation of monitoring whether QoS is sufficient can be achieved.

In an implementation form of a client device according to the first aspect, detecting that the QoS estimate does not fulfill the QoS requirement comprises
  determine that the QoS estimate for the radio link is below the QoS threshold value during a time period defined by a timer.

An advantage with this implementation form is that a low complexity implementation of monitoring whether QoS is sufficient can be achieved.

In an implementation form of a client device according to the first aspect, determine QoS estimates for the radio link comprises
  determine QoS estimates based on an identified signal received over the radio link.

An advantage with this implementation form is that by using an identified signal the QoS estimate can be determined in a simple way, i.e. with low complexity.

In an implementation form of a client device according to the first aspect, determine QoS estimates for the radio link comprises
  determine QoS estimates based on the identified signal and in dependence on at least one of a QoS monitoring rule, an offset factor, and a weight factor.

The QoS monitoring rule, offset factor, and the weight factor can be obtained from the QoS monitoring configuration and/or predefined in a standard.

An advantage with this implementation form is that the QoS estimate can be adapted based on application and user scenario in a simple way, i.e. with low complexity.

In an implementation form of a client device according to the first aspect, the identified signal is at least one of.
  a channel state information reference signal,
  a radio link monitoring reference signal,
  a beam failure detection reference signal,
  a synchronization signal block,
  a demodulation reference signal,
  an identified data channel, and
  an identified control channel.

An advantage with this implementation form is that the QoS estimate can be determined in a simple way, i.e. with low complexity, as existing well defined signals are used. No new signals need to be introduced, thereby simplifying the implementation in the network.

In an implementation form of a client device according to the first aspect, the QoS estimates are any of channel quality index values, signal-to-noise and interference ratio values, reference signal received quality values, and reference signal received quality values.

An advantage with this implementation form is that QoS estimates is based on well defined metrics in existing protocol stacks, e.g. the 3GPP NR protocol stack, leading to low complexity implementation in the client device.

In an implementation form of a client device according to the first aspect, the second layer is a radio resource control layer or a medium access control layer.

An advantage with this implementation form is that it is based on reuse of existing protocol layers, e.g. 3GPP NR defined protocol layers. Thereby, a low complexity implementation can be achieved.

In an implementation form of a client device according to the first aspect, the client device is further configured to
  transmit a control message to a network access node using control signaling in the first layer, wherein the control message indicates at least one of the first indication and the second indication.

An advantage with this implementation form is that the network access node can be informed of non-fulfillment and fulfillment of QoS requirements such that the client device and the network access node are synchronized regarding the status of the radio link. Thereby, improving QoS also in the network side of the application.

According to a second aspect of the invention, the above mentioned and other objectives are achieved with a method for a client device, the method comprises
  obtaining a QoS monitoring configuration associated with an application in a first layer;
  determining QoS estimates for a radio link, serving the application, in the first layer;
    providing a first indication from the first layer to a second layer upon detecting that a QoS estimate does not fulfill a QoS requirement obtained from the QoS monitoring configuration, wherein the first layer is a physical layer arranged below the second layer.

The method according to the second aspect can be extended into implementation forms corresponding to the implementation forms of the client device according to the first aspect. Hence, an implementation form of the method comprises the feature(s) of the corresponding implementation form of the client device.

The advantages of the methods according to the second aspect are the same as those for the corresponding implementation forms of the client device according to the first aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

The feature notification control has been introduced to allow the core network (CN) to be notified by the radio access network (RAN) when a negotiated QoS cannot be met. Notification control is applicable for guaranteed bit rate flows. The core network requests the radio access network to notify the core network, during a packet data unit (PDU) session life span, when a negotiated QoS cannot be met. This feature is intended for applications which can adjust to changes in QoS, e.g. video streaming where the video codec bit rate may be adjusted dynamically. For example, when an application in the data network is notified that a negotiated QoS cannot be met it can adjust its codec rate and the radio access network may then, if needed, reconfigure the data radio bearer to the client device to better suit the new bit rate.

In the lower layers, the client device monitors the radio link connection. Radio link failure (RLF) is declared in the client device after a certain preconfigured number of detected out-of-synchronizations (3GPP TS 38.133, section 8.1). An out-of-synchronization is defined as a certain number of radio link measurements over a time period, typically 50-500 ms, where the signal-to-interference and noise ratio (SINR) is too low to achieve sufficient downlink control channel decoding performance. At RLF, upper layers in the client device report "No-Service" to applications, while lower layers try to restore the radio link or search for a new radio link.

For beam management in NR a link recovery procedure has been developed (3GPP TS 38.213, section 6). The link recovery is introduced in order to, faster than RLF, determine new beams in case the current beam is blocked, hence the intention is to restore the link prior to RLF is declared.

Notification control is based in the core network with assistance from the radio access network. Interaction with the application in the client device would go via the core network to the corresponding application in the data network and then to the application in the client device. This is a slow mechanism and it further requires a working link to the client device, if the application in the data network would like to communicate with the application in client device upon a reported notification control. Hence, for URLLC use cases, this notification is too slow.

The RLF procedure is performed in the client device but it is also a slow mechanism. The purpose is to declare the radio link as lost and not to detect QoS problems early. The RLF procedure is suitable for enhanced mobile broadband (eMBB) type of applications but for sensitive URLLC applications the RLF procedure is too slow, typically in the order of 100 ms instead of single ms. Hence, the RLF procedure does not allow the application to take any precautionary actions. Setting the parameters for RLF to enable the client device to declare RLF at an earlier time may lead to unnecessary amount of radio link recovery procedures and increase the time spent with no service.

For link recovery procedure, the indication of link failure is made in non-DRX with a maximum period of 2 ms. However, a link recovery request, basically a random access, is triggered first after several times of link failure indications. Hence, the link recovery procedure still cannot fulfill the stringent latency requirement in NR.

Hence, the inventors realize that there is a need for a solution for declaring problems with the connection serving an application with fast response time compared to current conventional solutions.

Figure 1:
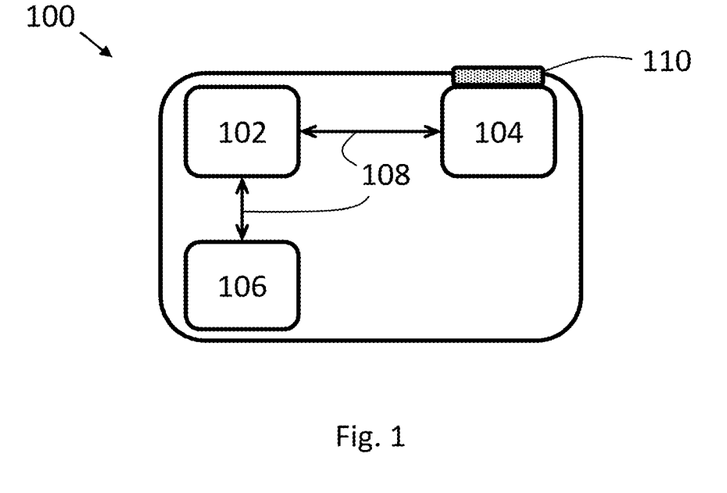
FIG. 1 shows a client device according to an embodiment of the invention.

FIG. 1 shows a client device 100 according to an embodiment of the invention. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system.

That the client device 100 is configured to perform certain actions can in this disclosure be understood to mean that the client device 100 comprises suitable means, such as e.g. the processor 102 and the transceiver 104, configured to perform said actions.

According to embodiments of the invention the client device 100 is configured to obtain a QoS monitoring configuration associated with an application in a first layer. The client device 100 is further configured to determine QoS estimates for a radio link, serving the application, in the first layer and provide a first indication from the first layer to a second layer upon detecting that a QoS estimate does not fulfill a QoS requirement obtained from the QoS monitoring configuration. The first layer is a physical layer arranged below the second layer.

Figure 2:
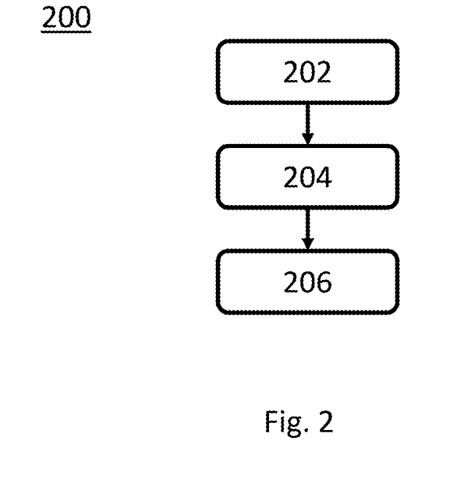
FIG. 2 shows a method for a client device according to an embodiment of the invention.

FIG. 2 shows a flow chart of a corresponding method 200 which may be executed in a client device 100, such as the one shown in FIG. 1. The method 200 comprises obtaining 202 a QoS monitoring configuration associated with an application in a first layer. The method further comprises determining 204 QoS estimates for a radio link, serving the application, in the first layer and providing 206 a first indication from the first layer to a second layer upon detecting that a QoS estimate does not fulfill a QoS requirement obtained from the QoS monitoring configuration. The first layer is a physical layer arranged below the second layer.

Figure 3:
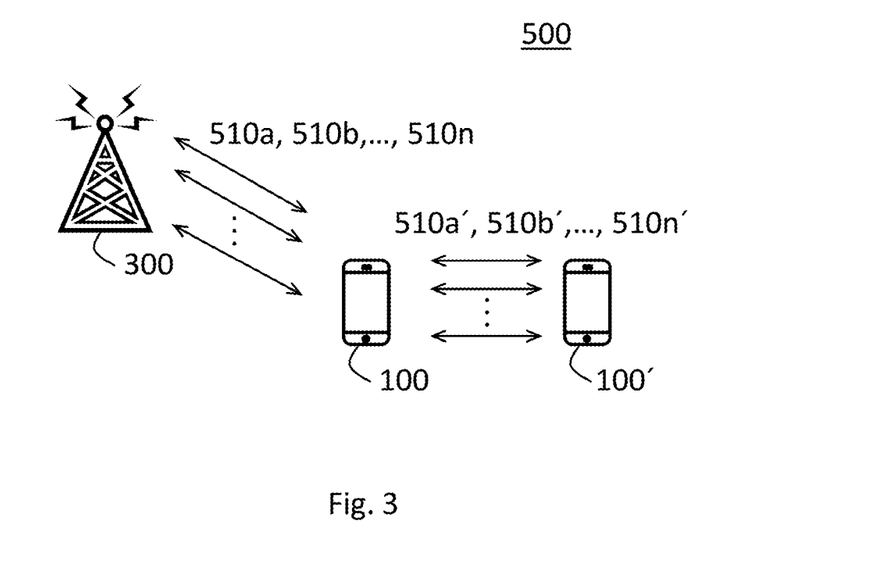
FIG. 3 shows a wireless communication system according to an embodiment of the invention.

FIG. 3 shows a wireless communication system 500 according to an embodiment of the invention. The wireless communication system 500 comprises a client device 100, in this embodiment denoted a first client device 100, a second client device 100', and a network access node 300 configured to operate in the wireless communication system 500. In the wireless communication system 500, one or more radio links 510a, 510b, ..., 510n are established between the network access node 300 and the first client device 100 to serve an application in the first client device 100. The application in the first client device 100 may be communicating with a corresponding application in a data network (not shown in FIG. 3) via the network access node 300 and a core network (not shown in FIG. 3). The radio links 510a, 510b, ..., 510n are associated with a certain QoS requested by the application. Alternatively or in addition, one or more radio links 510a', 510b', ..., 510n' may be established between the first client device 100 and the second client device 100' to serve the application in the first client device 100. The one or more radio links 510a', 510b', ..., 510n' may e.g. be NR sidelinks (SL), sometimes referred to as PC5 interfaces.

According to embodiments of the invention a solution for detecting and indicating that a QoS estimate for a radio link serving an application does not fulfill a QoS requirement associated with the application is introduced. The QoS estimate is determined in a first layer and a first indication is provided to a second layer upon detecting that the QoS estimate does not fulfill the QoS requirement. The detection and indication that a QoS estimate does not fulfill a QoS requirement according to the invention may be used to support a procedure for early indication of QoS non-fulfillment to the application in the client device 100. For example, a QoS non-fulfillment indication may be provided to the application based on one or more first indications. The QoS non-fulfillment indication may hence be triggered with low latency and can give the application an early warning of QoS problems on the radio links 510a, 510b, ..., 510n, 510a', 510b', ..., 510n' used by the application. The low latency of the QoS non-fulfillment indication makes it suitable for future applications types targeted for 5G, e.g. applications where failures to meet QoS can have dire consequences to the client device 100 hosting the application or other client devices in its proximity. The QoS non-fulfillment indication can be used to trigger, autonomously in the client device 100, a pre-programed behavior in the application. Examples of such pre-programmed behavior in the application is to take precautionary actions and/or enter into a "safe-mode". Practical examples of such "safe-mode" for in the vehicle-to-anything (V2X) area could be to decrease the speed and increase the distance between vehicles. For factory automation an actor, such as a robot, may simply halt its current activity. A drone may hover or return to a predefined location.

The introduction of the QoS non-fulfillment indication may play a vital role as a safety mechanism for future 5G applications, as a tool to prevent potential dire issues that could be caused by an instantaneous QoS degradation.

The invention introduces a detection method that can be used to support the QoS non-fulfillment indication to the application in the client device. The detection method according to the invention identifies QoS estimates for radio links serving an application which do not fulfil QoS requirements associated with the application.

Figure 4:
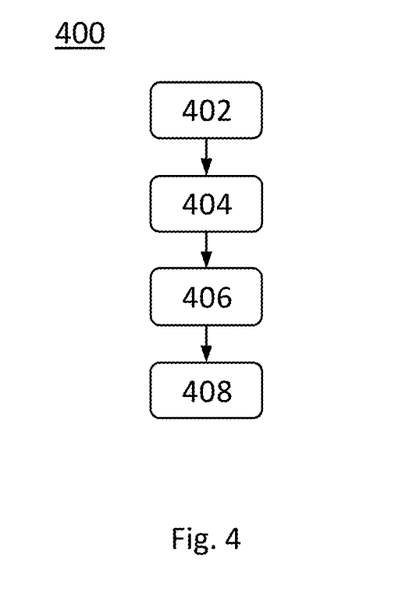
FIG. 4 shows a method for detecting a non-fulfillment of a QoS requirement according to an embodiment of the invention.

FIG. 4 shows a flow chart of a method 400 for detecting that a QoS estimate does not fulfill a QoS requirement according to an embodiment of the invention. The method 400 may be performed in the client device 100. In step 402, the client device 100 obtains a QoS configuration associated with an application, e.g. from the network access node 300.

The application may e.g. be a service which has low latency and high reliability requirements such as a URLLC service. The QoS configuration may be received by the client device 100 as part of a configuration step, i.e. when the client device 100 is configured with the application by the network. The QoS configuration may be associated with a non-access stratum (NAS) layer, a service data adaptation protocol (SDAP) layer, an application layer, a user plane function (UPF), or access management function (AMF). The QoS configuration comprises at least one QoS requirement, where the QoS requirement may be a QoS requirement requested by the application.

Based on the obtained QoS configuration, the client device 100 obtains a QoS monitoring configuration associated with the application in step 404. The QoS monitoring configuration is obtained in a first layer, which is the physical layer, and is a configuration based on which the client device 100 monitors the QoS of radio links in the first layer. In embodiments, the client device 100 may obtain the QoS monitoring configuration by mapping the QoS configuration to a QoS monitoring configuration for the first layer. The mapping may e.g. comprise applying rules and/or formulas to information/parameters in the QoS configuration to derive the QoS monitoring configuration, where the rules and/or formulas may be pre-defined in a standard, or received in a configuration from the network access node 300. The QoS monitoring configuration may indicate at least one of: a QoS monitoring rule, the radio link serving the application, a timer associated with the radio link, a QoS requirement, an offset factor, a weight factor. That the QoS monitoring configuration indicates the listed information can herein mean that the information is either explicitly or implicitly comprised in the QoS monitoring configuration. Hence, the client device 100 can based on the information in the QoS monitoring configuration either directly or indirectly, e.g. using additional information, derive one or more of the QoS monitoring rule, the radio link serving the application, the timer associated with the radio link, the QoS requirement, the offset factor, and the weight factor. The QoS requirement may be dependent on one or more characteristics of QoS flows or IP packet flows associated with the application, wherein the one or more characteristics are at least one of a 5G QoS identifier, a QoS flow identifier, a resource type, a packet error rate, a packet delay budget, a survival time and a jitter. The resource type indicates whether a QoS flow is of the type guaranteed bit rate (GBR), delay-critical GBR, or non-GBR flow. The definition of packet error rate and packet delay budget are different for GBR and delay-critical GBR resource types. Furthermore, the survival time can be the time period that an application consuming a communication service may continue without an anticipated message. The QoS requirement may further be dependent on capability and capacity of the network access node 300.

In step 406, the client device 100 determines QoS estimates for the radio link serving the application in the first layer. The client device 100 may determine QoS estimates based on an identified signal received over the radio link. Furthermore, the client device 100 may determine QoS estimates based on the identified signal and in dependence on at least one of a QoS monitoring rule, an offset factor, and a weight factor. For example, the client device 100 may determine the QoS estimate as a function of the identified signal based on the QoS monitoring rule, the offset factor and/or the weight factor. The QoS monitoring rule may in embodiments specify how the QoS estimate should be determined, e.g. specify type of identified signal, determination function, and whether an offset factor or weight factor should be used. The QoS monitoring rule may further specify how often a QoS estimate should be determined for the radio link by the client device 100, e.g. whether the client device 100 should determine the QoS estimates for the radio link continuously and/or periodically. In embodiments, the client device 100 may obtain the QoS monitoring rule, the offset factor, and/or the weight factor from the QoS monitoring configuration.

The identified signal may be a reference signal which is configured in relation to the QoS configuration obtained from the network and/or predefined by a standard. In embodiments, more than one type of reference signals may be used to determine the QoS estimates. The identified signal may further be a signal over an identified channel which has been successfully decoded. For example, a decoded data symbol received over a data channel associated with the radio link or a control signal received over a control channel associated with the radio link. The identified signal may be at least one of a channel state information reference signal (CSI-RS), a sidelink channel state information reference signal (SL CSI-RS), a radio link monitoring reference signal (RLM-RS), a beam failure detection reference signal (BFD-RS), a synchronization signal block (SSB), a demodulation reference signal (DMRS), a sidelink demodulation reference signal (SL DMRS), an identified data channel, and an identified control channel. The client device 100 may determine the QoS estimates for the radio link based on one or more types of reference signals. For example, the client device 100 may consider both CSI-RS and SSB and determine/update the QoS estimate, each time a CSI-RS or SSB is received. Furthermore, the QoS estimate may be determined in different ways depending on whether CSI RS or RLM RS is used, e.g. different offset factors or scaling factors may be used depending on the type of reference signal. The QoS estimate may further be filtered over several consecutive QoS estimates, to obtain a filtered QoS estimate. When several consecutive QoS estimates are considered a weight factor may be used. As previously described, the weight factor may be obtained from the QoS monitoring configuration. In this way, the last QoS estimate may be given a higher weight compared to any of the earlier QoS estimates included in the filtered QoS estimate.

According to embodiments of the invention, the QoS estimates are any of channel quality index (CQI) values, signal-to-noise and interference ratio (SINR) values, reference signal received quality (RSRQ) values, and reference signal received quality (RSRP) values. More specifically, the QoS estimates may be SINR, RSRQ, or RSRP values based on layer 1, CSI or SS, i.e. L1-RSRP, CSI-SINR, CSI-RSRQ, CSI-RSRP, SS-SINR, SS-RSRQ, or SS-RSRP.

In step 406, the client device 100 monitors the QoS estimates for the radio link determined in step 404 based on the QoS monitoring configuration. The client device 100 monitors the QoS estimates to detect whether the QoS estimates fulfill a QoS requirement obtained from the QoS monitoring configuration. Step 406 may e.g. include the client device 100 assessing/comparing the QoS estimates against the QoS requirement. In embodiments, the QoS requirement is a QoS threshold value obtained from the QoS monitoring configuration. In such embodiments, the monitoring may comprise the client device 100 comparing the QoS estimates against the QoS threshold value. The client device 100 may obtain the QoS threshold value explicitly from the QoS monitoring configuration or implicitly from the QoS monitoring configuration in dependence on a predefined rule. For example, client device 100 may derive the QoS threshold value using information in the QoS monitoring configuration together with the predefined rule.

Upon detecting in step 406 that a QoS estimate does not fulfill the QoS requirement, the client device 100 provides/sends in step 408 a first indication from the first layer to a second layer arranged above the first layer. The first layer is the physical layer and the second layer may be a radio resource control layer (RRC) layer or a medium access control (MAC) layer. The second layer may then in turn provide the first indication, possibly after modification or filtering, to a higher layer. The second layer may e.g. provide the first indication, or a QoS non-fulfillment indication based on first indications, to the application in the client device 100 via one or more intermediate layers.

In embodiments where the QoS requirement is a QoS threshold value, detecting that the QoS estimate does not fulfill the QoS requirement may comprises determine that the QoS estimate for the radio link is equal to or below the QoS threshold value. This may correspond to the determined QoS estimate being equal to or lower/worse than the QoS thresholds value. In some embodiments, detecting that the QoS estimate does not fulfill the QoS requirement may instead comprises determine that the QoS estimate for the radio link is equal to or above the QoS threshold value. Whether the QoS estimate should be below or above the QoS threshold value to indicate a non-fulfillment may depend on the type of value used as a QoS estimate, i.e. whether a low or high QoS estimate indicates a low quality.

The detection that the QoS estimate does not fulfill the QoS requirement may further comprise a time aspect. Thus, detecting that the QoS estimate does not fulfill the QoS requirement may comprise determine that the QoS estimate for the radio link is equal to or below the QoS threshold value during a time period defined by a timer. The timer may be a timer associated with the radio link and may be obtained from the QoS monitoring configuration. In this way, a first indication is only provided to the second layer if the QoS estimate is equal to or below the QoS threshold value for a predefined time period. Thereby, indications for temporary dips in the QoS estimates can be avoided.

In addition to detecting a non-fulfillment, the monitoring in step 406 may detect fulfillment of the QoS requirement, i.e. detect that a QoS estimate fulfills the QoS requirement. Upon detecting in step 406 that a QoS estimate fulfills the QoS requirement, the client device 100 may in step 408 provide a second indication from the first layer to the second layer. In this way, the first layer can indicate to the second layer when the quality of the radio link has improved such that it again fulfills the QoS requirement.

According to embodiments of the invention the QoS monitoring configuration can comprise information for two or more QoS flows, where each QoS flow may be associated with different QoS requirements. The QoS flows can be mapped to one or more radio links such that one radio link can be used by more than one QoS flow. When the client device 100 monitors QoS estimates for a radio link used by two or more QoS flows with different QoS requirements, the client device 100 monitors the QoS estimates against all the different QoS requirements obtained from the QoS monitoring configuration. Upon detecting that a QoS estimate violates one or more of the QoS requirements, i.e. a subset of the QoS requirements, a first indication is provided to the second layer for each of the QoS requirements in the subset.

The client device 100 may further indicate any detected non-fulfillment or fulfillment of the QoS requirement to the network access node 300. The client device 100 may e.g. transmit a control message to the network access node 300 using control signaling in the first layer, where the control message indicates at least one of the first indication and the second indication.

It is envisaged that embodiments of the invention can be implemented in 3GPP standard. For example, the QoS monitoring configuration herein disclosed may e.g. be added in an existing 3GPP information element (IE) such as the CSI-ReportConfig IE. Hence, parameters such as e.g. the QoS threshold, the offset factor, and the weight factor may be added to the CSI-ReportConfig IE. Furthermore, more than one parameter may be defined for each of the QoS threshold, the offset factor, and the weight factor, to make it possible to configure more than one QoS monitoring configuration per radio link.

In one embodiment where the QoS monitoring configuration is added in the CSI-ReportConfig IE, the QoS estimate may be based on the CQI calculation according to section 5.2.2.1 in TS 38.214 and the QoS monitoring configuration may include an additional factor, such as e.g. the offset factor, to be applied in the CQI calculation. In this case, the QoS threshold may be a CQI index threshold [0 . . . 15] according to the CQI table configured in the CSI-ReportConfig. When the QoS estimate, i.e. the CQI index calculated based on the CQI calculation according to the standard with the additional factor, is below or equal to the CQI index threshold, a first indication is provided to the second layer. In an implementation of such an embodiment the parameter CQI_QoS threshold may be included in the CSI-ReportConfig 1E and the following text may be added to section 5.2.2.1 in TS 38.214: If a UE is configured with higher layer parameter CQI_QoS threshold, the UE shall compare the "above derived highest CQI index" to CQI_QoS_threshold. In case the "above derived highest CQI index" is smaller than the CQI_QoS threshold then the UE shall send an indication to higher layers (MAC).

In another embodiment where the QoS monitoring configuration is added in the CSI-ReportConfig IE, the QoS estimate may be based on the L1-RSRP calculation according to section 5.2.1.4.3 in TS 38.214 and the QoS monitoring configuration may include an additional factor, such as e.g. the offset factor, to be applied in the L1-RSRP calculation. In this case, the QoS threshold may be a L1-RSRP threshold configured in the CSI-ReportConfig 1E. When the QoS estimate, i.e. the L1-RSRP value calculated based on the L1-RSRP calculation according to the standard with the additional factor, is below or equal to the L1-RSRP threshold, a first indication is provided to the second layer. In an implementation of such an embodiment the parameter L1-RSRP_QoS threshold may be included in the CSI-ReportConfig IE and the following text may be added to section 5.2.1.4.3 in TS 38.214: If a UE is configured with higher layer parameter L1-RSRP_QoS threshold derived based on the QoS requirement of a specific traffic type, the UE shall compare the "above highest measured L1-RSRP value" to L1-RSRP_QoS_threshold. In case the "above highest measured L1-RSRP value" is smaller than the L1-RSRP_QoS_threshold then the UE shall send an indication to higher layers (MAC).

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket- storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 may be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A client device for a wireless communication system, the client device comprising:
   a processor; and
   a memory coupled to the processor and having processor-executable instructions stored thereon, which are executed by the processor and cause the processor to:
      obtain a Quality-of-Service (QoS) monitoring configuration associated with an application in a first layer;
      determine QoS estimates for a radio link serving the application in the first layer; and
      provide a first indication from the first layer to a second layer upon detecting that a QoS estimate does not fulfill a QoS requirement obtained from the QoS monitoring configuration, wherein the first layer is a physical layer arranged below the second layer,
         wherein the first indication triggers, autonomously in the client device, a pre-programed behavior in the application, and
         wherein the pre-programmed behavior in the application comprises taking precautionary actions and/or entering into a safe-mode.

2. The client device according to claim 1, wherein the processor is further configured to provide a second indication from the first layer to the second layer upon detecting that a QoS estimate fulfills the QoS requirement.

3. The client device according to claim 1, wherein the QoS monitoring configuration indicates at least one of:
   a QoS monitoring rule, the radio link serving the application, a timer associated with the radio link, a QoS requirement, an offset factor, a weight factor.

4. The client device according to claim 1, wherein the QoS requirement is dependent on one or more characteristics of QoS flows or IP packet flows associated with the application, wherein the one or more characteristics are at least one of a 5G QoS identifier, a QoS flow identifier, a resource type, a packet error rate, a packet delay budget, a survival time and a jitter.

5. The client device according to claim 1, wherein the QoS requirement is a QoS threshold value obtained from the QoS monitoring configuration.

6. The client device according to claim 5, wherein the QoS requirement is a QoS threshold value obtained from the QoS monitoring configuration in dependence on a predefined rule.

7. The client device according to claim 5, wherein detecting that the QoS estimate does not fulfill the QoS requirement comprises determining that the QoS estimate for the radio link is below the QoS threshold value.

8. The client device according to claim 7, wherein detecting that the QoS estimate does not fulfill the QoS requirement comprises determining that the QoS estimate for the radio link is below the QoS threshold value during a time period defined by a timer.

9. The client device according to claim 1, wherein determining the QoS estimates for the radio link comprises determining QoS estimates based on an identified signal received over the radio link.

10. The client device according to claim 9, wherein determine the QoS estimates for the radio link comprises determining QoS estimates based on the identified signal and in dependence on at least one of a QoS monitoring rule, an offset factor, and a weight factor.

11. The client device according to claim 9, wherein the identified signal is at least one of:
    a channel state information reference signal,
    a radio link monitoring reference signal,
    a beam failure detection reference signal,
    a synchronization signal block,
    a demodulation reference signal,
    an identified data channel, and
    an identified control channel.

12. The client device according to claim 9, wherein the QoS estimates are any of channel quality index values, signal-to-noise and interference ratio values, reference signal received quality values, and reference signal received quality values.

13. The client device according to claim 1, wherein the second layer is a radio resource control layer or a medium access control layer.

14. The client device according to claim 1, wherein the processor is further configured to transmit a control message to a network access node using control signaling in the first layer, wherein the control message indicates at least one of the first indication and the second indication.

15. A method applied to a client device, the method comprising:
    obtaining a Quality-of-Service (QoS) monitoring configuration associated with an application in a first layer;
    determining QoS estimates for a radio link serving the application in the first layer; and
    providing a first indication from the first layer to a second layer upon detecting that a QoS estimate does not fulfill a QoS requirement obtained from the QoS monitoring configuration, wherein the first layer is a physical layer arranged below the second layer,
       wherein the first indication triggers, autonomously in the client device, a pre-programed behavior in the application, and
       wherein the pre-programmed behavior in the application comprises taking precautionary actions and/or entering into a safe-mode.

16. A non-transitory computer-readable medium comprising a program code that is executed by a processor of a computer to perform a method including:
    obtaining a Quality-of-Service (QoS) monitoring configuration associated with an application in a first layer;
    determining QoS estimates for a radio link serving the application in the first layer; and
    providing a first indication from the first layers to a second layer upon determining that a QoS estimate does not fulfil a QoS requirement obtained from the QoS monitoring configuration, wherein the first layer is a physical layer arranged below the second layer,
       wherein the first indication triggers, autonomously in the client device, a pre-programed behavior in the application, and
       wherein the pre-programmed behavior in the application comprises taking precautionary actions and/or entering into a safe-mode.

17. The method according to claim 15, further comprising providing a second indication from the first layer to the second layer upon detecting that a QoS estimate fulfills the QoS requirement.

18. The method according to claim 15, wherein the QoS monitoring configuration indicates at least one of: a QoS monitoring rule, the radio link serving the application, a timer associated with the radio link, a QoS requirement, an offset factor, a weight factor.

19. The non-transitory computer-readable medium according to claim 16, wherein the method further comprises providing a second indication from the first layer to the second layer upon detecting that a QoS estimate fulfills the QoS requirement.

20. The non-transitory computer-readable medium according to claim 16, wherein the QoS monitoring configuration indicates at least one of: a QoS monitoring rule, the radio link serving the application, a timer associated with the radio link, a QoS requirement, an offset factor, a weight factor.

* * * * *